(12) United States Patent
Takagi et al.

(10) Patent No.: US 7,907,221 B2
(45) Date of Patent: Mar. 15, 2011

(54) TELEVISION DEVICE

(75) Inventors: Toshihiro Takagi, Daito (JP); Kosuke Kinoshita, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1189 days.

(21) Appl. No.: 11/546,363

(22) Filed: Oct. 12, 2006

(65) Prior Publication Data
US 2007/0089130 A1    Apr. 19, 2007

(30) Foreign Application Priority Data
Oct. 13, 2005  (JP) .................................. 2005-299031

(51) Int. Cl.
*H04N 5/50* (2006.01)
(52) U.S. Cl. ........................................ 348/731; 348/732
(58) Field of Classification Search .......... 348/731–733, 348/554, 725, 555, 553; 725/38
See application file for complete search history.

(56) References Cited

U.S. PATENT DOCUMENTS
6,188,448 B1 * 2/2001 Pauley et al. ................. 348/731
2002/0140871 A1 * 10/2002 Piotrowski et al. ........... 348/731

FOREIGN PATENT DOCUMENTS
JP          09-055894       2/1997
JP          2004-134866     4/2004

* cited by examiner

*Primary Examiner* — M. Lee
(74) *Attorney, Agent, or Firm* — Pillsbury Winthrop Shaw Pittman, LLP

(57) ABSTRACT

A television device includes a reception device, a first decision unit, and a second decision unit. The reception device receives, from a broadcast signal of a system set, a channel which is tuned. The second decision unit, when it has been decided by the first decision unit that this channel for which tuning has been received is not registered in the channel map of the set broadcast signal, decides whether or not this channel is registered in the channel map of the broadcast signal of some other system. And, when it has been decided by the second decision unit that this channel for which tuning has been received is registered in the channel map of the broadcast signal of some other system, the reception device receives the channel for which tuning has been received from the broadcast signal of some other system.

4 Claims, 3 Drawing Sheets

| PHYSICAL CHANNEL | VIRTUAL CHANNEL | SUB CH | | | | |
|---|---|---|---|---|---|---|
| | | 1 | 2 | 3 | ... | 99 |
| 2 | 8 | — | — | — | ... | — |
| 4 | 10 | — | ○ | — | ... | — |
| 8 | 9 | — | — | ○ | ... | — |
| 14 | 4 | — | ○ | — | ... | — |

FIG. 2A

| PHYSICAL CHANNEL | VIRTUAL CHANNEL | SUB CH | | | | |
|---|---|---|---|---|---|---|
| | | 1 | 2 | 3 | ... | 99 |
| 4 | 5 | — | — | — | ... | — |
| 10 | 3 | — | ○ | — | ... | — |
| 21 | 10 | — | — | ○ | ... | — |
| 30 | 8 | ○ | — | ○ | ... | — |

FIG. 2B

TELEVISION DEVICE

CROSS REFERENCE

This Nonprovisional application claims priority under 35 U.S.C. §119(a) on Patent Application No. 2005-299031 filed in Japan on Oct. 13, 2005, the entire contents of which are hereby incorporated by reference.

BACKGROUND OF THE INVENTION

The present invention relates to a television device which receives television broadcasts, such as a liquid crystal television or a plasma television.

A television device which receives television broadcasts, such as a liquid crystal television or a plasma television, receives broadcast signals of a plurality of systems, such as ATSC (Advanced Television Systems Committee) surface wave signals, digital cable broadcasts, and the like, and displays videos based upon these broadcast signals. The user sets the broadcast signal of the system which he wishes to view by actuating a remote control device or the like.

Furthermore, there are many channels in the broadcast signal of each system, and the user tunes the desired channel by actuating the remote control device or the like. As actuation at this time for performing tuning, the user may perform actuation by pressing a key so as to tune through the channels in ascending order, or in descending order, or to set the channel directly.

Although there are typically many channels in the broadcast signal of each system, it is unusual for the user to view programs upon all of the channels; he normally limits his viewing to a certain set of preferred channels. Due to this, in consideration of convenience of channel tuning by the user, it is made to be possible to store a channel map in the television device, in which only the channels which are to the user's taste are registered. Such a channel map is built up for each of the broadcast signals of the plurality of systems, and each channel map is only applied to the broadcast signal of the system for which it has been set up. Thus, when changing the setting of the broadcast signal system, this channel map must also be changed.

The user is also able, by actuating the remote control device or the like, to tune only the channels which are registered in this channel map. As disclosed in Japanese Laid-Open Patent Publication H09-55894, with actuation for tuning in this case as well, in the same manner as described above, it is possible to perform actuation to tune the channels in ascending order, or to perform actuation to tune them in descending order, or to perform actuation for designating the channel directly. Furthermore if, when performing tuning by using the channel map, a channel which is not registered is tuned directly, then a display is provided to the effect that this channel is not registered.

Furthermore, with a modern television device, as disclosed in Japanese Laid-Open Patent Publication 2004-134866, there is a type in which, in consideration of convenience of channel tuning by the user, it is arranged, if the same channel is present in the broadcast signals of different systems, to append an identifier to this channel, and to select the broadcast signal of the system to be received, and to receive the program, from the channel and the identifier which have been tuned.

However, with a television device such as the one disclosed in Japanese Laid-Open Patent Publication H09-55894 or the like, if for example, during tuning for the channel map, in the state in which the user has forgotten to change the setting to the broadcast signal of the system which he desires, he directly tunes a channel which is registered in the channel map of the broadcast signal of the system which he desires, then, since the channel which has been tuned is not registered in the channel map of the broadcast signal of the system which is currently set, accordingly a message to that effect is displayed, which is not desirable. Due to this, the user must tune the channel again after having changed to the setting of the broadcast system which he desires, and this entails rather a lot of labor.

The object of the present invention is to provide a television device which, even if a channel has been tuned which is registered in the channel map of a broadcast signal of another system which is not the one currently set, can receive the channel which has thus been tuned, thus enhancing the convenience to the user of performing channel tuning.

SUMMARY OF THE INVENTION

The television device of the present invention includes a setting unit, a storage unit, a reception device, a first decision unit, and a second decision unit. The setting unit sets, from among broadcast signals of a plurality of systems, a broadcast signal of a system which it receives. The storage unit stores, for each broadcast signal system, a channel map in which one or more channels which are tuned are registered. The reception device receives, from the broadcast signal of the system set by the setting unit, a channel which is tuned. The first decision unit, when tuning of a channel is received, decides whether or not this channel for which tuning has been received at this time is registered in the channel map of the broadcast signal of the system set by the setting unit. And the second decision unit, when it has been decided by the first decision unit that this channel for which tuning has been received at this time is not registered in the channel map of the broadcast signal of the system set by the setting unit, decides whether or not this channel is registered in the channel map of the broadcast signal of some other system.

And, moreover, when it has been decided by the second decision unit that this channel for which tuning has been received at this time is registered in the channel map of the broadcast signal of some other system, the reception device receives the channel for which tuning has been received at this time from the broadcast signal of the system which corresponds to the channel map in which this channel is registered.

BRIEF DESCRIPTION OF THE DRAWINGS

FIG. 2A is an explanatory figure showing an image of a channel map of a broadcast signal of an ATSC surface wave, and FIG. 2B is an explanatory figure showing an image of a channel is map of a broadcast signal of a digital cable broadcast.

DETAILED DESCRIPTION OF THE INVENTION

In the following, a liquid crystal television will be explained which is a television device according to an embodiment of the present invention.

Figure 1:
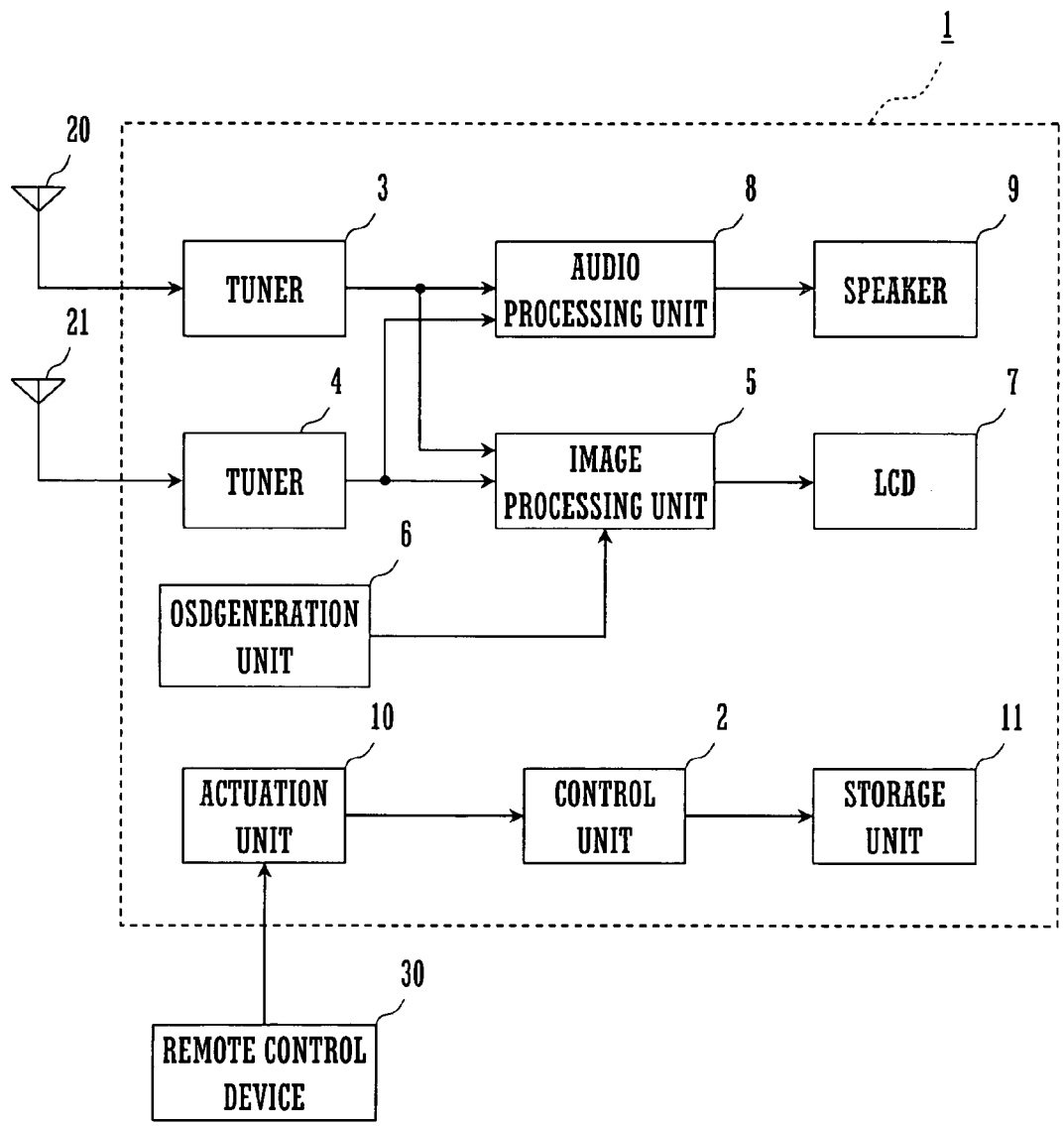
FIG. 1 is a block diagram showing the structure of the main portion of a liquid crystal television according to an embodiment of the present invention.

FIG. 1 is a block diagram showing the structure of the main portion of a liquid crystal television according to an embodiment of the present invention. This liquid crystal television device 1 comprises a control unit 2 which controls the overall operation of the device, and a tuner 3 which receives, via an antenna 20, and outputs, a channel to which it has been tuned in an ATSC surface wave broadcast signal.

Furthermore, this liquid crystal television device 1 comprises another tuner 4 which receives, via an antenna 21, and outputs, a channel to which it has been tuned in a digital cable broadcast signal, and a video processing unit 5 which displays a video based upon the broadcast signal outputted by the tuner 3 or by the tuner 4 upon a LCD (Liquid Crystal Display) 7.

Moreover, the liquid crystal television device 1 comprises an OSD generation unit 6 which generates an on-screen image signal (hereinafter termed the OSD image signal) such as an operation guide screen or the like, and an audio processing unit 8 which outputs audio from a speaker 9 based upon the broadcast signal outputted by the tuner 3 or the tuner 4. Furthermore, the liquid crystal television device 1 comprises an actuation unit 10 which performs input actuation, and a storage unit which stores various types of set values such as a channel map and the like.

The control unit 2 performs control according to the input received by the actuation unit 10. The image processing unit 5 synthesizes and outputs a video of the broadcast signal outputted by the tuner 3 or the tuner 4, and the OSD image signal which is generated by the OSD generation unit 6. The actuation unit 10 receives input such as channel tuning, turning of the volume up and down, and so on. As far as the method of input actuation for this channel tuning is concerned, an up key or a down key not shown in the figure may be pressed in order to tune through the channels in ascending order or in descending order respectively, or the desired channel may be designated directly.

Furthermore, the actuation unit 10 receives a setting of which broadcast signal of which system which the user wishes to view, among the ATSC surface wave broadcast signal and the digital cable broadcast signal. The actuation unit 10 corresponds to the "setting unit" of the Claims. The control unit 2 stores the broadcast signal of the system for which it has received setting in the storage unit 11, and moreover receives the channel which has been tuned in that tuner 3 or 4, among the tuners 3 and 4, which receives the broadcast signal of that system which has been set, and outputs it. It should be understood that the tuners 3 and 4 may actually be a single tuner which can be changed over to receive the broadcast signals of both systems. The tuners 3 and 4 correspond to the "reception device" of the Claims.

FIGS. 2A and 2B are explanatory figures showing example images of channel maps. The storage unit 11 stores channel maps of the broadcast signals for each system, as shown in that figure. And the actuation unit 10 also receives registrations of channels into the channel map of the broadcast signal of each system.

Such a channel map is provided for the broadcast signal of each of the systems, and it is possible for the user to register, in these channel maps, only those channels, among the channels which are received in the broadcast signal of each system, which he wishes thus to register. Furthermore, it is only possible to tune to the channels which are registered in these channel maps. The actuation unit 10 receives settings for performing tuning according to the channel maps. As far as the method of input actuation for this channel tuning is concerned in this case as well, just as before, actuation may be performed in order to tune through the channels in ascending order or in descending order respectively, or the desired channel may be designated directly.

It should be understood that FIG. 2A is a figure showing a channel map for the ATSC surface wave broadcast signal, while FIG. 2B is a figure showing a channel map for the digital cable broadcast signal. And, in each of these channel maps, the "○" signs indicate that the channels described at the edges are registered.

In tuning according to these channel maps, the channel map of the broadcast signal of the system which is set is applied. When the setting for the broadcast signal of the system has been changed, the control unit 2 reads out the channel map of the broadcast signal of the system after change from the storage unit 11.

Figure 3:
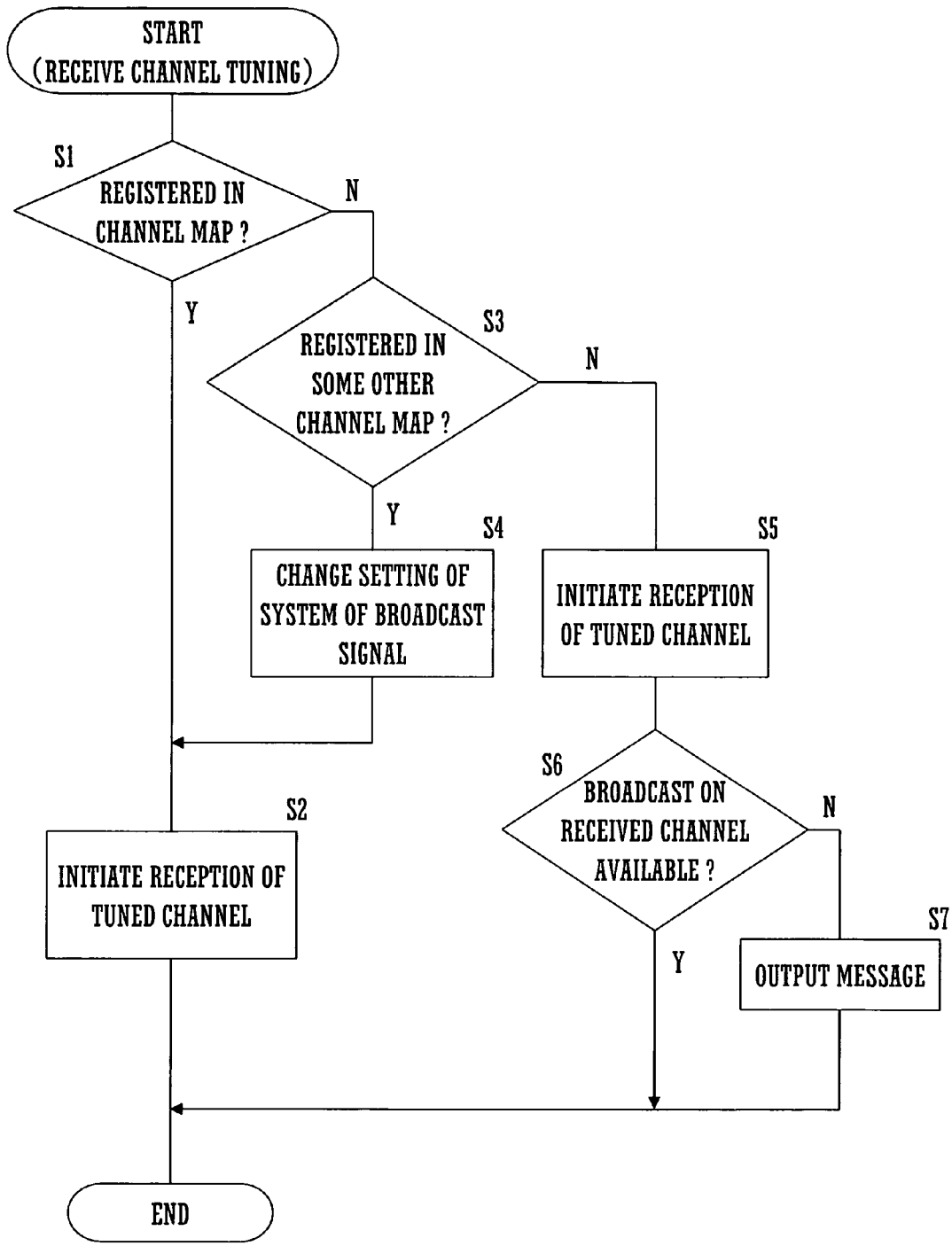
FIG. 3 is a flow chart showing the flow of processing when performing tuning of a channel directly, according to the channel map, upon the liquid crystal television according to this embodiment of the present invention.

FIG. 3 is a flow chart showing the flow of processing when performing tuning of a channel directly with the channel map.

When, in the state in which setting is made to perform tuning according to the channel map, the remote control device 30 or the like is actuated and setting (tuning) of a channel directly is performed, the control unit makes a decision as to whether or not the channel for which tuning has been received at this time is registered in the channel map of the broadcast signal of the system which is currently set (S1). In concrete terms, the channel map of the broadcast signal of the system which is currently set and the channel for which tuning has been received at this time are compared together.

If, in the processing of S1, the control unit 2 has decided that this channel is registered in the set channel map, then it initiates the reception of the channel for which tuning has been received at this time (S2), and this overall process terminates. For example, if the broadcast signal of the system which is currently set is the ATSC surface wave broadcast signal, then, when the user tunes the virtual channel CH10 and the sub-channel SUBCH2, reception of this channel is initiated, since, as shown in FIG. 2A, it is registered in the channel map.

If, on the other hand, in the processing of S1, the control unit 2 has decided that this channel for which tuning has been received at this time is not registered in the channel map of the broadcast signal of the system which is currently set, then it makes a decision as to whether or not the channel for which tuning has been received at this time is registered in the channel map of the broadcast signal of any other system (S3). In concrete terms, after having read out from the storage unit 11 the channel map of the broadcast signal of the system which is not currently set, it makes a comparison with the channel for which tuning has been received at this time. Accordingly, the control unit 2 corresponds to the "first decision unit" and the "second decision unit" of the Claims.

If, in the processing of S3, the control unit 2 has decided that this channel is actually so registered, then it changes the setting from the broadcast signal of the system which is currently set to the broadcast signal of the system which corresponds to the channel map in which this channel is registered (i.e. stores this new setting in the storage unit 11) (S4), transits to the processing of S2, initiates reception of the channel for which tuning has been received this time, and then terminates the overall processing.

For example, if the broadcast signal of the system which is currently set is the broadcast signal of the ATSC surface wave, then, when the user tunes the virtual channel CH8 and the sub-channel SUBCH1, although, as shown in FIG. 2A, this is not registered in the channel map, since it is registered in the channel map of the digital cable broadcast shown in FIG. 2B which has been read out, accordingly the control unit 2 changes the broadcast signal setting from the broadcast signal of the ATSC surface wave to the broadcast signal of the digital cable broadcast, and initiates reception of the channel for which tuning has been received at this time.

On the other hand, if in the processing of S3 the control unit 2 has decided that this channel is not registered in the channel map of the broadcast signal of any other system either, then it performs reception of the channel for which tuning has been received at this time in the broadcast signal of the system which is currently set (S5). In concrete terms, it receives the channel for which tuning has been received at this time in the tuner 3 or the tuner 4 which corresponds to the broadcast signal of the system which is set.

This is because, when the channel for which tuning has been received at this time is simply not registered in any channel map, it is sometimes also possible to receive it from the broadcast signal of the system which is set. By doing this, since this channel is being received even though it is a channel which is not registered in the channel map, it is able simply to tune the channel directly, and accordingly it is possible to enhance the convenience to the user during channel tuning.

Next, the control unit 2 makes a decision as to whether or not broadcasting is being performed upon the channel of which reception has been initiated (S6). In concrete terms, it makes this decision according as to whether or not, in the processing of S5, it has received a notification to the effect that a broadcast has been received from the tuner 3 or the tuner 4 for which has been initiated reception of the channel for which tuning has been received this time.

If, in the processing of S6, the control unit 2 has decided that broadcasting is being performed upon the channel for which tuning has been received this time, then it terminates the overall processing. On the other hand if, in the processing of S6, the control unit 2 has decided that broadcasting is not being performed upon the channel for which tuning has been received this time, then it outputs a message to this effect (S7), and then terminates the overall processing. In concrete terms, it synthesizes an image of a message which has been generated by the OSD generation unit 6 in the image processing unit 5, and outputs it. By doing this, it is possible to alert the user immediately to the fact that broadcasting is not being performed upon the channel which has been tuned. Accordingly, the image processing unit 5 corresponds to the "output unit" of the Claims.

As described above, when it has been decided that the channel for which tuning has been received is registered in the channel map of the broadcast signal of another system, by performing reception of that channel for which tuning has been received, it is possible to economize upon the labor of changing the broadcast signal of the system which is set and of re-tuning to that channel, so that it is possible to enhance the convenience to the user of channel tuning.

It should be understood that although, in this embodiment, the case was described in which broadcast signals of two systems were received, i.e. of an ATSC surface wave and of a digital cable broadcast, this is not to be considered as being particularly limitative of the present invention; the present invention could be applied to the case of a plurality of systems, and in particular to the case of a broadcast signal upon an NTSC (National Television Standards Committee) surface wave or the like.

Moreover although, in the above embodiment, in the processing of S4, the control unit performed processing to change the setting to the broadcast signal of the other system, it would also be acceptable not to perform such a change of setting, but simply to perform reception from the tuner 3 or the tuner 4 which receives the broadcast signal of the system which corresponds to that channel map in which is registered the channel for which tuning has been received this time.

Furthermore, although this embodiment of the present invention has been explained with reference to a liquid crystal type television device 1, it could also be applied to some other type of television device, like a plasma type television or a cathode ray tube type television or the like, and the same beneficial effects could be obtained.

Finally, in the above described explanation of an embodiment of the present invention, all of the features are shown by way of example, and should not be considered as being limitative of the present invention. The scope of the present invention is not to be defined by any of the features of the embodiment described above, but only be the scope of the appended Claims. Moreover, equivalents to elements in the Claims, and variations within their legitimate and proper scope, are also to be considered as being included within the range of the present invention.

What is claimed is:

1. A television device, comprising:
    a setting unit which sets, from among broadcast signals of a plurality of systems, a broadcast signal of one system to be received;
    a storage unit which stores, for each broadcast signal system, one channel map in which one or more tuned channels are registered;
    a first decision unit which, when tuning of a channel is received, decides whether or not the channel for which tuning has been received at this time is registered in a first channel map of a broadcast signal of a first system which is set by the setting unit;
    a second decision unit which, when the first decision unit decides that the channel for which tuning has been received at this time is not registered in the first channel map, decides whether or not this channel is registered in a second channel map of a broadcast signal of a second system which is not set by the setting unit; and
    a reception device which, when the second decision unit decides that the channel for which tuning has been received at this time is registered in the second channel map, receives the channel for which tuning has been received at this time from the broadcast signal of the second system, among the broadcast signals of the plurality of systems,
    wherein, when the second decision unit decides that the channel for which tuning has been received at this time is not registered in the second channel map either, the reception device receives the channel for which tuning has been received at this time from the broadcast signal of the first system, among the broadcast signals of the plurality of systems.

2. The television device as described in claim 1,
    wherein, when the second decision unit decides that this channel for which tuning has been received at this time is registered in the second channel map, the setting unit sets the broadcast signal of the second system as the broadcast signal of the one system to be received.

3. The television device as described in claim 1, further comprising an output unit which, when the second decision unit decides that this channel for which tuning has been received at this time is not registered in the second channel map either, and when the reception device receives this channel for which tuning has been received at this time from the broadcast signal of the first system, if no broadcasting is being performed upon this channel, outputs a message to that effect.

4. The television device as described in claim 1, wherein the broadcast signals of the plurality of systems are broadcast signals of two systems of an ATSC (Advanced Television Systems Committee) surface wave broadcast and a digital cable broadcast.

* * * * *